United States Patent [19]

Johnson

[11] 4,345,828
[45] Aug. 24, 1982

[54] LIGHT DETECTING APPARATUS FOR PHOTOGRAPHIC CAMERA

[75] Inventor: Bruce K. Johnson, Andover, Mass.

[73] Assignee: Polaroid Corporation, Cambridge, Mass.

[21] Appl. No.: 219,930

[22] Filed: Dec. 24, 1980

[51] Int. Cl.$^3$ .......................... G03B 7/08; G03B 9/38; G03B 9/40

[52] U.S. Cl. ..................................... 354/27; 354/29; 354/230; 354/247

[58] Field of Search ................................. 354/26–30, 354/42, 49, 127, 59, 60 A, 230, 270, 248, 247; 355/35, 38; 356/222, 221, 225, 234, 235, 404; 250/214 P, 226

[56] References Cited

U.S. PATENT DOCUMENTS

| | | | |
|---|---|---|---|
| 3,270,638 | 9/1966 | Anwyl et al. | 354/59 |
| 4,147,418 | 4/1979 | Whiteside et al. | 354/27 |
| 4,255,031 | 3/1981 | Johnson et al. | 354/127 X |
| 4,315,677 | 2/1982 | Johnson et al. | 354/49 |

Primary Examiner—Richard A. Wintercorn
Assistant Examiner—William B. Perkey
Attorney, Agent, or Firm—Francis J. Caufield

[57] ABSTRACT

Photographic scene light detecting apparatus particularly suitable for use with a camera of the type which includes an electronic control system for receiving an input signal and controlling the firing of an electronic flash at a predetermined time after the initiation of an exposure interval. The apparatus includes a photodetector and an optical system by which scene radiation can be collected from a predetermined field of view and directed along an optical path onto the photodetector which operates to provide an output signal for use as the input signal to the camera electronic control system. A blade apparatus operates to selectively block and unblock the optical path to the photodetector such that the photodetector receives scene radiation from one region of the scene prior to the firing of the electronic flash and from another region of the scene in correspondence with the firing of the electronic flash.

5 Claims, 12 Drawing Figures

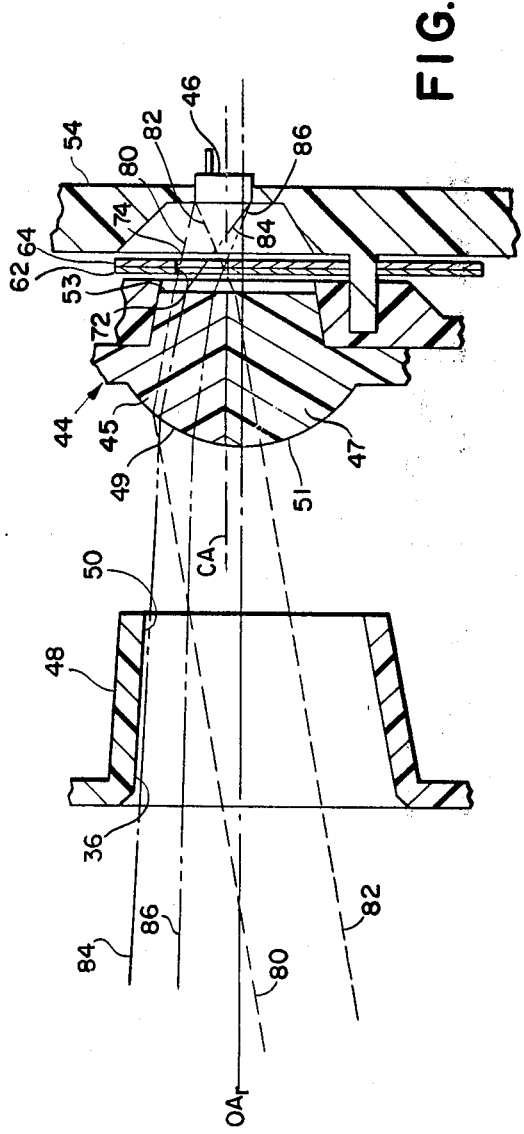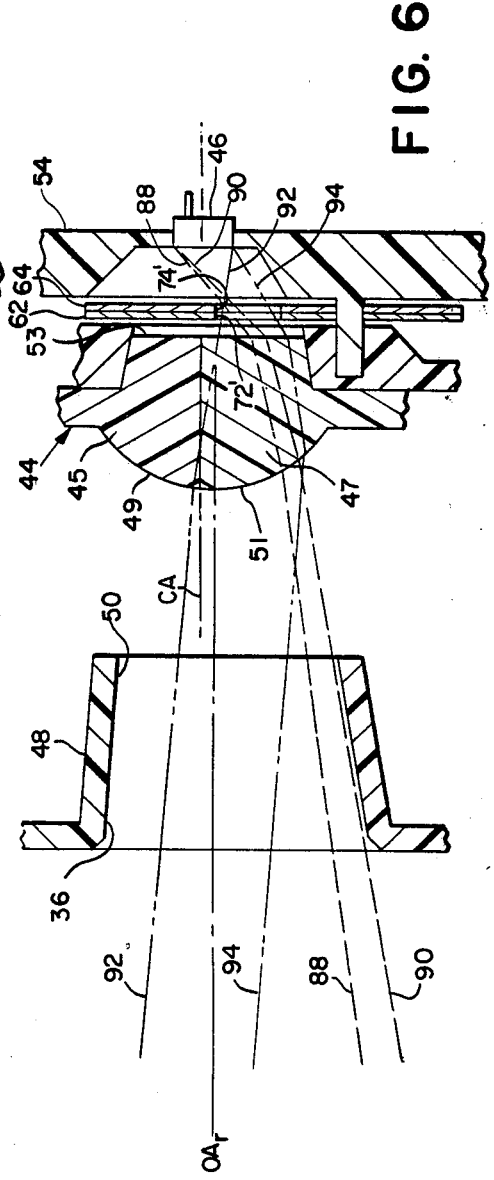

LIGHT DETECTING APPARATUS FOR PHOTOGRAPHIC CAMERA

BACKGROUND OF THE INVENTION

1. Field of the Invention

This invention in general relates to photographic camera apparatus, and, in particular, to scene light detecting apparatus for use with an automatic camera of the type having an electronic control system for receiving an input signal and controlling the firing of an electronic flash at a predetermined time after the initiation of an exposure interval.

2. Description of the Prior Art

Built-in light detecting devices which form an integral part of an automatic camera exposure control arrangement are well-known to those skilled in the photographic arts. Such light detecting devices generally consist of one or more photovoltaic or photoresistive type transducers associated with an optical system so that light from a preselected area of the scene to be photographed can be directed onto the photosensitive surface(s) of the transducer(s). An electrical output signal indicative of the intensity of the brightnesses of the various objects located in the preselected area of the scene is derived from the transducer(s) and is thereafter generally utilized to control the exposure delivered to the film in accordance with the sensitometric characteristics of the film and the known performance characteristics of the other elements which comprise the exposure control arrangement. The electrical output signal may be used prior to actual exposure to automatically adjust the exposure settings of the camera or may be used after an exposure cycle is initiated to terminate the cycle upon satisfaction of a predetermined exposure condition.

The preselected area of the scene depends on the "angle of acceptance" of the light detecting device; the "angle of acceptance" meaning the solid angle of the cone of light received by the light detecting device. Thus, if light from a particular scene object is to have an influence on the magnitude of the output signal of the light detecting device, that object must be located within the device's angle of acceptance, i.e., the object must be "seen" by the device. It is apparent therefore that the angle of acceptance of such light detecting devices can be used as a means for controlling what the exposure will be in the sense that it can be aimed at a certain area of the scene which is considered important in preference to another area of the scene which may not be considered quite as important.

However, what the angle of acceptance should be for a particular light detecting device depends on the kinds of scenes it will probably be used to measure and the type of lighting which is used to illuminate those scenes. Consider, for example, a horizontal landscape illuminated by skylight or sunlight. With this type of scene and lighting conditions, it is generally desirable to have a light detecting device which looks generally downwardly to exclude the sky whose influence, if considered, would tend to cause the ground details to be underexposed. As another example, consider a portrait scene illuminated with an artificial light source. In this type scene, it is generally desirable to have the light detecting device "look" straight ahead so as to receive substantially all the light reflected from the central part of the scene thereby exposing for proper fleshtones.

Those skilled in the art have recognized the important role that the angle of acceptance of such light detecting devices plays in controlling exposure and have described a number of light detecting devices by which the importance of different areas of a scene can be established via the device angle of acceptance. For example, in U.S. Pat. No. 3,511,142 issued to Conrad H. Biber on May 12, 1970 and entitled "Exposure Control Means", there is described an exposure control system which has a parameter which is modified in response to the attachment of a flash unit to a camera in which the exposure control system is incorporated. Specifically, attachment of the flash unit shifts a movable element into operative position relative to four photocells such that the fields of view (angles of acceptance) of the photocells are substantially congruent, each covering substantially the angular field of view of the camera. Under ambient lighting conditions (i.e., without a flash unit attached) the movable element is operatively positioned relative to the photocells so that each photocell is provided with a smaller angle of acceptance each of which is aimed at a different portion of the scene being photographed. With this arrangement, the angle of acceptance of each photocell is changed from a small solid angle when used in the ambient mode to a large solid angle when used in the flash mode thereby affecting a change in the sensitivity of each photocell in accordance with the size of its angle of acceptance.

Another example is described in U.S. Pat. No. 3,232,192 issued to Allen G. Stimpson on Feb. 1, 1966 and entitled "Photographic Exposure Measuring Device". Here an exposure control system is described which utilizes a plurality of photocells one of which is positioned to measure the intensity of skylight and others, each having a different acceptance angle, for viewing a corresponding different zone of the scene to be photographed. A pair of the photocells are fixedly aimed at different selected zones of the scene and their individual angles of acceptance, when combined, cover substantially all of the scene as defined by the angular field of view of the camera. No provision is made for preferentially exposing different zones of the scene by changing the angular direction in which the photocells are aimed at the scene. Instead individual zones of the scene are given preferential treatment by providing the photocells with different sensitivities and combining their outputs in an electrical arrangement by which a single output is generated to indicate or automatically regulate proper exposure.

Another example is shown in U.S. Pat. No. 4,173,400 issued to Faramarz Faramarzpour on Feb. 2, 1978 and entitled "Photographic Camera Apparatus". Here, an automatic camera having distinct ambient and flash exposure modes of operation is provided with a scene light detecting apparatus which has a predetermined angle of acceptance that, depending on the camera exposure mode, aims in different angular directions at a scene. This is accomplished by an arrangement that is responsive to the insertion of an artificial light source to aim the angle of acceptance above the camera horizontal axis.

The known prior art arrangements for changing the angle of acceptance of unicell devices is apparently restricted to cameras of the type which have distinct ambient and flash exposure modes of operation requiring some action on the part of a photographer, e.g., inserting of flash device or switching, to convert the camera from one operating mode to another and aiming the angle of acceptance is keyed to this action. However, cameras have been described recently which do not have distinct ambient and flash exposure modes that operate independently of one another and at the selection of the photographer. Such cameras are referred to as proportional fill-flash types and have exposure control systems that operate to control the firing of electronic quench type strobes under a range of natural lighting intensities such that film exposure is due to a mixture of available natural light and strobe light whose proportion changes in accordance with the intensity of the natural available light. Examples of such proportional fill flash systems are described in U.S. Pat. No. 4,192,587 entitled "Proportional Fill Flash" by A. LaRoque et al., issued Mar. 11, 1980, and U.S. patent application Ser. No. 074,993 filed in the names of Bruce K. Johnson et al. on Sept. 13, 1979 and entitled "Camera With Proportional Fill Flash Quench Strobe".

Since proportional fill flash type cameras do not require any selection on the part of a photographer which causes a camera to convert between different and distinct types of exposure modes, it is a primary object of the present invention to provide scene light detecting apparatus for use with such cameras and having an angle of acceptance which aims at different regions of a scene in a predetermined manner.

Another object of the present invention is to provide scene light detecting apparatus having an angle of acceptance which can automatically be aimed at different regions of a scene after an automatic camera exposure cycle has been initiated.

It is another object of the present invention to provide scene light detecting apparatus for use with proportional fill flash type systems to aim at different regions of a scene depending on whether film exposure is due primarily to natural light or strobe light.

Other objects of the invention will, in part, be obvious and will, in part, appear hereinafter. Accordingly, the invention comprises the apparatus possessing the construction, combination of elements and arrangement of parts that are exemplified in the following detailed disclosure.

SUMMARY OF THE INVENTION

The present invention relates to photographic scene light detecting apparatus that is particularly suitable for use with a camera of the type which includes means for facilitating the positioning of film in an exposure plane, a light path for transmitting scene light to the exposure plane, and an electronic control system for receiving an input signal and controlling the firing of an electronic flash at a predetermined time after the initiation of an exposure interval.

The scene light detecting apparatus of the invention comprises light detecting means, including at least one photodetector having a photosensitive surface of predetermined size with a central axis therethrough, for providing an electrical output signal for use as the input signal to the camera electronic control system. The photodetector output signal has a characteristic which varies in accordance with the amount of radiant power incident to its photosensitive surface.

Additionally included in the invention are optical means having an optical axis and structured to cooperate with the photosensitive surface of the photodetector to define an optical path having a predetermined field of view from which radiant energy from a scene can be collected by the optical means and directed onto the photodetector photosensitive surface whereby the photodetector operates to provide its output signal.

Also provided in the invention is a blade apparatus and means for mounting the blade apparatus for displacement between a first arrangement in which the blade apparatus is simultaneously in light blocking relation to both the camera light path and the optical path to the photodetector thereby precluding scene light from being transmitted along the camera light path and from impinging on the photodetector photosensitive surface and a second arrangement in which the blade apparatus is simultaneously in light unblocking relation to both the camera light path and at least a portion of the optical path to the photodetector. The blade apparatus is structured to define a primary varying aperture aligned with the camera light path which aperture changes from an initial value to a final value during displacement of the blade apparatus from its first to second arrangement and is further structured to selectively unblock different portions of the optical path to the photodetector during displacement of the blade apparatus from its first to second arrangement so that the photodetector receives scene radiation from different regions of a scene for different positions of the blade apparatus to facilitate exposure control. One of the scene regions corresponds to a time prior to the firing of the electronic flash and another of the scene regions corresponds to a time after the firing of the electronic flash.

In a preferred embodiment of the invention, the optical means comprises, arranged along its optical axis, a positive lens corrected to minimize spherical aberration and a lens hood structured to limit the extreme bundle of rays that can be directed by the positive lens onto the photosensitive surface of the photodetector which is preferably located at the focus of the positive lens.

The blade appaatus preferably comprises a pair of opaque, elongated blae elements mounted for counter-reciprocating motion with espect to one another along their respective elongated dmensions wherein each blade element has formed therein a rimary aperture of predetermined size and shape and at last two other apertures, each of predetermined size and hape and each spaced away from the primary aperture by different predetermined distances as measured along the elongated dimension of their respective blade element. The blade apertures are further arranged so that, when the blade apparatus is in its first arrangement, the blade element primary apertures and the other apertures are all misaligned with respect to one another to block the camera light path and the optical path to the photodetector and so that, as the blade apparatus moves toward its second arrangement, the blade primary apertures progressively overlap one another in alignment with the camera light path to define the primary varying aperture and corresponding ones of the blade element other apertures progressively overlap one another to selectively unblock the optical path to the photodetector at different times to permit light from the different scene regions to travel to the photodetector.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIGS. 5 and 6 are enlarged cross-sectional views, taken generally along line 5—5 in FIG. 1, illustrating selected light ray paths for different positions of certain of the apparatus illustrated in FIG. 2;

DESCRIPTION OF THE PREFERRED EMBODIMENT

The present invention relates to a light detecting apparatus which forms part of a camera automatic exposure control system. In its preferred embodiment, the present invention is shown incorporated in a virtually fully automatic type camera which utilizes self-processable type film and which is designated generally at 10 in FIG. 1. Although shown incorporated in the camera 10, it is to be expressly understood that the invention is not limited in use to only those types of photographic apparatus represented by the camera 10. However, as will be discussed below, the camera 10 does have certain features which make the invention, at least in part, particularly suitable for use with it.

Figure 1:
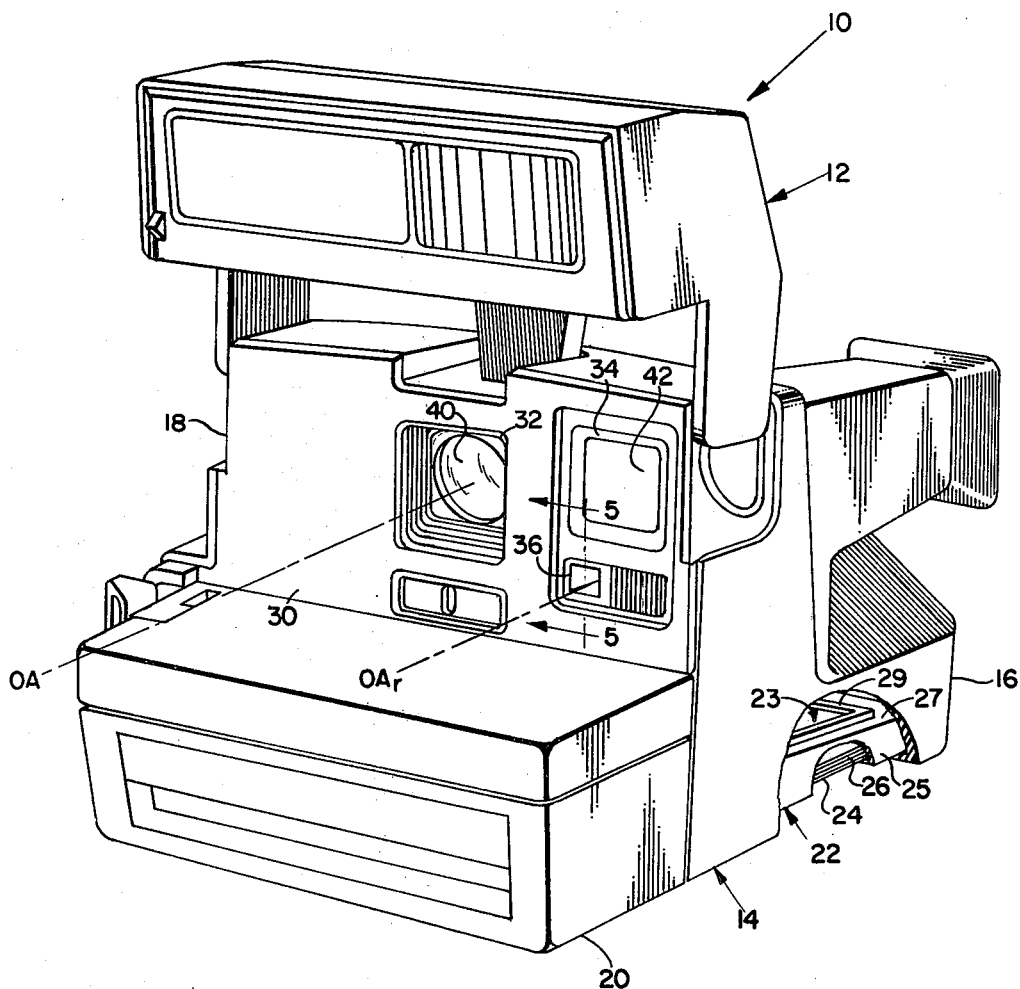
FIG. 1 is a perspective view, with parts broken away, of a camera in which the present invention is incorporated.

As best seen in FIG. 1, the camera 10 includes an electronic flash unit 12, preferably of the quench type, mounted on a rigid body 14 for movement between an erect operative position, as illustrated in FIG. 1, and a folded inoperative position which is not illustrated. The rigid camera body 14 includes a generally prismatic shaped major housing 16, a generally L-shaped front housing 18, and a generally rectangularly-shaped film loading door 20 which collectively define its outward appearance and serve to house and protect its interior components. The aforementioned housings, 16 and 18, and the film loading door 20 are all preferably molded of an opaque plastic to preclude unwanted light from entering the camera interior.

Formed in the base of the prismatic housing 16 is a well-known film cassette receiving chamber generally designated at 23. The chamber 23 is adapted to releasably hold a film cassette such as that designated at 22. The cassette 22 comprises a generally rectangular parallelepiped housing 25 which has an upwardly facing wall 27 having a generally rectangular aperture 29 therein. Mounted in registration with and biased toward the aperture 29 is a stacked array of integral type self-processable film units generally designated at 26. Each of the film units 26 has a given film speed requiring a predetermined exposure which is provided by the camera 10 in a manner to be described. Underneath the stacked array of film units 26 is a flat, thin battery 24 which is electrically coupled in a well-known manner to power the various electrical systems of the camera 10. An example of such a film cassette is described in considerable detail in U.S. Pat. No. 3,872,487 issued to Nicholas Gold on Mar. 18, 1975 and entitled "Photographic Film Assemblage and Apparatus" and of such film units in U.S. Pat. Nos. 3,415,644; 3,594,165; and 3,761,268.

Formed in a vertical forward wall 30 of the L-shaped housing 18 are a number of apertures, designated at 32, 34, and 36. Mounted in registration with the aperture 32 is an objective taking lens 40 that is arranged along an optical axis, OA, and positioned forwardly of an aperture formed in an opaque exposure chamber (not shown) that is positioned in a well-known manner inside the prismatic shaped housing 16 and also has a prismatic shape generally complementary to the interior shape of the housing 16. The exposure chamber entrance aperture is represented diagrammatically at 66 in FIG. 2.

Located within the exposure chamber is a trapezoidal-shaped mirror (not shown) that is arranged at a predetermined angle with respect to the optical axis, OA, and the film plane to provide a folded light path of predetermined length therebetween along which image forming scene rays from the objective taking lens 40 travel to the film within the cassette 22 during a camera exposure cycle. The exposure chamber is of the type which is described in considerable detail in U.S. Pat. No. 4,057,815 issued to Bruce K. Johnson on Nov. 8, 1977 and entitled "Anti-Flare Structure for Photographic Optical System". It will be recognized by those skilled in the art that, with this type optical arrangement, the objective taking lens 40 and the peripheral edges of the film cassette aperture 29 cooperate to define the field of view of the camera 10, the field of view defining the subject matter that will be recorded during photoexposure.

Mounted in registration with the aperture 34 is a negative lens 42 which forms part of a reversed Galilean viewfinder that is structured in a well-known manner to have a field of view that is substantially coextensive with that of the camera 10 to facilitate aiming the camera 10 in order to frame the subject matter to be recorded in a picture.

Figure 2:
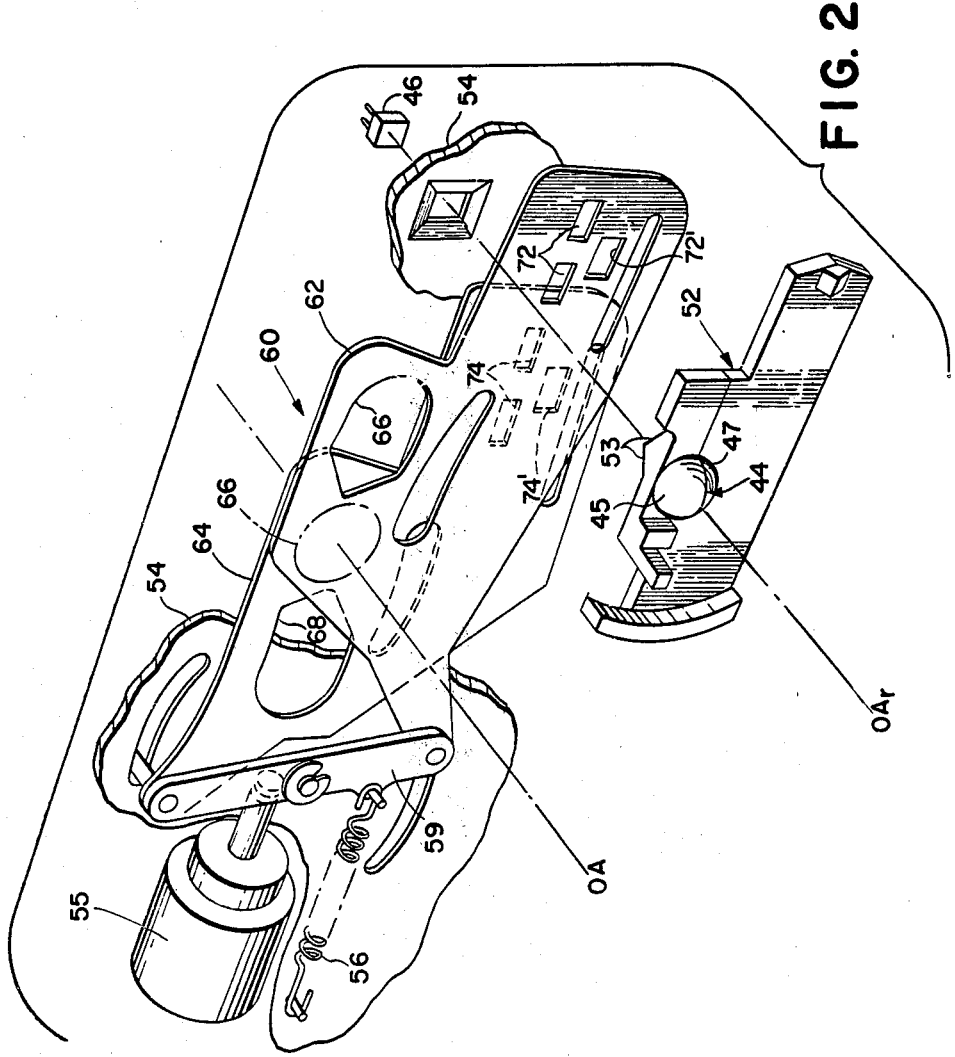
FIG. 2 is an enlarged exploded perspective view of part of the camera of FIG. 1 shown in combination with the invention.

The aperture 36, located beneath the viewfinder entrance aperture 34, is the entrance to a cone-like tunnel or hood 48 (FIGS. 5 and 6) that is arranged along an optical axis, $OA_r$, and is structured to admit radiation from a scene into the interior of the camera housing 14. Located behind an exit aperture 50 of the tunnel 48 is an optical element 44 behind which is positioned a photodetector 46, preferably of the photoelectric type, both of which are also arranged along the optical axis, $OA_r$, as shown in FIGS. 2, 5 and 6.

The optical element 44 is integrally formed in a two part plastic lens plate 52 and is of the type more fully described in U.S. patent application Ser. No. 193,892 filed in the name of Bruce K. Johnson et al. on Oct. 6, 1980 and entitled "Dynamically Controlled Scene Reduction Leakage For Exposure Control" and is comprised of an upper part 45 that is structured to transmit only radiation in the visible region of the spectrum and a lower part 47 structured to transmit only radiation in the near infrared region of the spectrum. Both the upper and lower parts, 45 and 47, are provided with forward converging faces, 49 and 51, respectively and rearwardly facing wedge faces 53. The converging faces, 49 and 51, are corrected in a well-known manner to minimize spherical aberrations and provide the optical element 44 with a predetermined focal length.

The photodetector 46 is mounted in an apertured interior wall 54 of the camera 10 and has a photosensitive surface of predetermined area having a central axis, CA, extending therethrough. The central axis, CA, is offset above the optical axis, $OA_r$, as best shown in FIGS. 5 and 6 and the photodetector 46 is spaced behind the optical element 44 by a distance equal to the focal length of the optical element 44. The photodetector 46 is preferably a silicon photodiode type arranged in a reversed biased manner to provide an output signal which has an electrical characteristic that varies in a given manner in accordance with the amount of radiant power incident to its photosensitive surface.

The tunnel 48 and the optical element 44 define optical means which cooperate in a well-known manner with the photosensitive surface of the photodetector 46 to define a photometer having an optical path with an angular field of view from which radiant energy from a photographic scene can be collected by the optical means and directed onto the photosensitive surface of the photodetector 46 whereby the photodetector 46 operates to provide its output signal.

A blade apparatus 60 (see FIG. 2) operates in a manner to be described to selectively block and unblock different portions of the optical path to the photodetector 46 so that, during an exposure interval, the photodetector 46 receives radiation from different regions of a scene. As will be seen hereinafter, the blade apparatus 60 is also responsible, in part, for providing the output signal from the photodetector 46 with a characteristic by which the output signal varies in a directional manner to the influence of radiation from objects located at different positions in the scene.

Exposure of the film units 26 is regulated in a well-known manner through the use of an automatic exposure control system of the type that is more fully described in U.S. patent application Ser. No. 074,993 filed on Sept. 13, 1979 in the name of Bruce K. Johnson et al. and entitled "Camera With Proportional Fill Flash Quench Strobe" and in U.S. Pat. No. 4,023,187. The exposure control system described in the above-referenced U.S. patent application utilizes the output signal of the photodetector 46 to control the firing of the electronic flash 12 so as to automatically provide a proportional fill flash under conditions where the natural or ambient scene lighting is of high intensity and may also control the firing of the electronic flash 12 underconditions of negligible ambient scene light intensity wherein the proportion of the exposure attributable to the artificial scene light provided by the electronic flash 12 automatically increases in correspondence with decreases in the ambient scene light intensity. For this purpose, the automatic exposure control system of the camera 10 includes the solenoid operated blade apparatus 60 which is of the general type illustrated in detail in U.S. Pat. No. 4,040,072 and also in U.S. patent application Ser. No. 193,892. As described in these two references and as illustrated in FIG. 2, the blade apparatus 60 includes a pair of overlapping opaque shutter blades, 62 and 64, that are reciprocally driven by a pivoting walking beam mechanism between positions blocking and unblocking the exposure path through the objective lens 40 and the optical path to the photodetector 46. The walking beam mechanism includes a pivotally mounted walking beam 59 to which the blades, 62 and 64, are pinned in a well-known manner. A solenoid 55 is attached to the walking beam 59 and drives the blades, 62 and 64, to their blocking position as illustrated in FIG. 2 when energized. When the solenoid 55 is not energized, a biasing spring 56 drives the blades, 62 and 64, to their unblocking position (not shown). The blades, 62 and 64, are normally held in the blocking position against the bias of the spring 56 by a known mechanical shutter latching device (not shown).

Each of the blades, 62 and 64, have primary apertures, 66 and 68 respectively, that overlap one another as they traverse the optical path of the camera 10 after the blades, 62 and 64, have been released from their blocking position. The primary apertures, 66 and 68, are shaped so that upon overlapping one another during counter movement of the blades, 62 and 64, they define an effective exposure aperture value over the exposure chamber entrance aperture 66. The exposure or taking aperture increases in area to a maximum value in a predeterminate period of time as shown by the curve 70 in FIG. 3.

The blades, 62 and 64, each are also provided with a series of secondary apertures, 72 and 72' and 74 and 74', respectively, which permit scene light to impinge on the photodetector 46 in correspondence with the scene light admitted to the film during movement of the blades, 62 and 64, during the exposure cycle of the camera 10. The photodetector output signal is directed to an integration circuit (not shown) that triggers upon reaching an integration level corresponding to a desired exposure level to terminate the exposure interval by returning the shutter blade elements, 62 and 64, back to their initial scene light blocking position.

Figure 3:
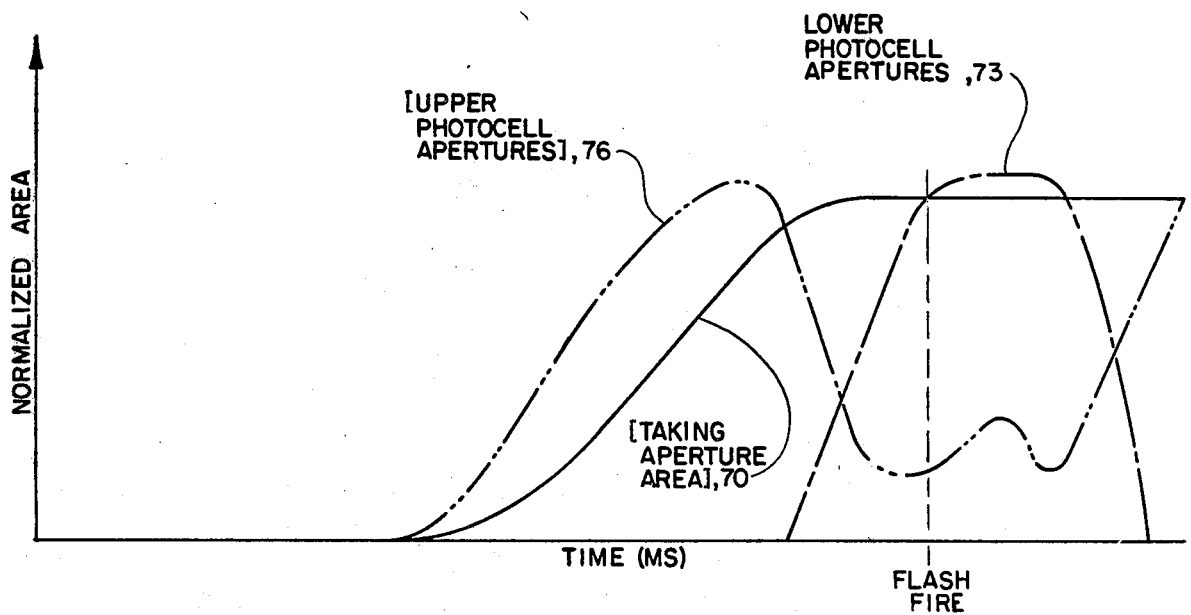
FIG. 3 is a graphical representation showing in normalized fashion the time variation in various aperture areas provided by part of the apparatus illustrated in FIG. 2.

The light admitting areas along the optical path to the photodetector 46, provided by the apertures 72 and 74, are also illustrated in FIG. 3 wherein it can be seen that the upper apertures, 72 and 74, provide the area designated by the curve 76 whereas the lower apertures, 72' and 74', provide the area or opening designated by the curve 73. As can be appreciated from FIG. 2, the upper apertures, 72 and 74, are the first to overlap one another as the blades, 62 and 64, move away from their blocking position. As a consequence of this, the upper apertures, 72 and 74, are first registered with the upper part 45 of the optical element 44 as best illustrated in FIG. 5, and thereafter open to a peak value as indicated by the curve 76. After reaching the peak value, the upper apertures, 72 and 74, decrease in area over the upper part 45 of the optical element 44 and subsequently again increase to provide again a larger area over the upper part 45 of the optical element 44. This can also be seen from FIG. 5. The center and lower edges of the upper apertures, 72 and 74, are also located above the optical axis, $OA_r$. The vertical height of the upper apertures 72 and 74 is smaller than the vertical height of the lower apertures 72' and 74' (compare in FIGS. 2, 5 and 6).

After the blades, 62 and 64, have reached a predetermined position along their path of travel from their unblocking position, the lower apertures, 72' and 74', begin to overlap one another in alignment with the lower part 47 of the optical element 44 and, as the blades, 62 and 64, continue to travel, the area of the opening provided by the overlapping of the lower apertures, 72' and 74', increases to a peak value and thereafter decreases as illustrated by the curve 72 in FIG. 3 and by the diagrammatic illustration in FIG. 6. Thus, at different times during the movement of the shutter blades, 62 and 64, from their blocking position illustrated in FIG. 2, different portions of the optical element 44 are allowed to transmit light to the photodetector 46. This is done for reasons which are set forth in detail in previously-referenced U.S. patent application Ser. No. 193,892.

Briefly, however, the photocell apertures, 72, 72', 74 and 74', are arranged in the foregoing manner so that the different portions of the optical element 44 will transmit light to the photodetector 46 at different times throughout the movement of the shutter blades, 62 and 64, from their unblocking position. The different portions of the optical element 44 are provided with different spectral transmission characteristics as previously described so that at appropriate times during the exposure control cycle flash exposure generally is controlled by infrared light returning from the scene, while under pure natural ambient light, exposure is generally controlled by ordinary visible radiation returning from the scene. In this connection, the exposure control circuit in previously-referenced U.S. patent application Ser. No. 074,993 is structured to control the firing of the electronic strobe 12 at a predetermined time after the initiation of the camera exposure interval and in correspondence with the lower ones of the apertures, 72 and 74, being over the lower part 47 of the optical element 44 as indicated in FIG. 3.

Figure 4:
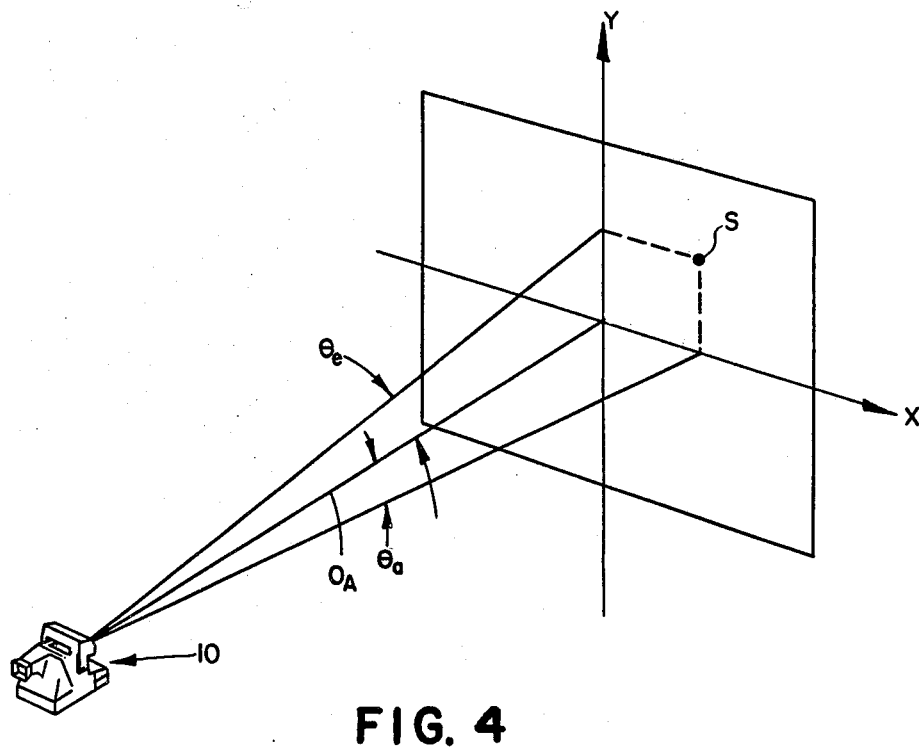
FIG. 4 is a diagrammatic perspective view showing the camera of FIG. 1 positioned forwardly of a plane in which a light source can be systematically moved for purposes of measuring the angular directional response and field of view of the invention.
Figure 7:
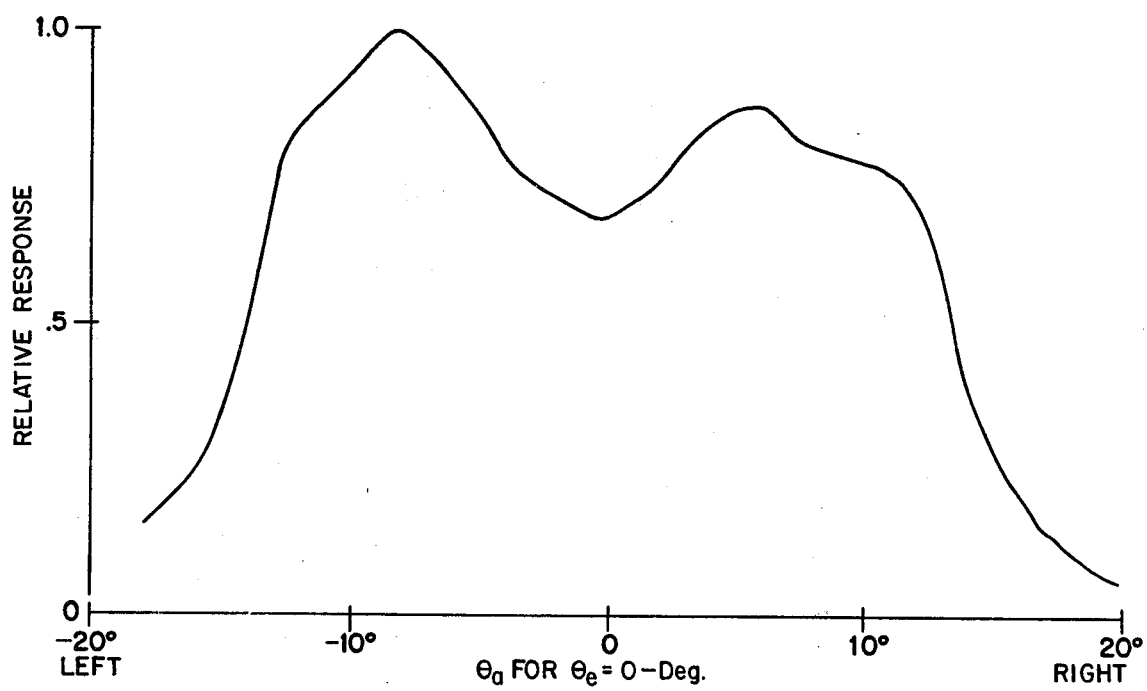
FIGS. 7 and 8 are graphical representations showing the angular directional response curves for the invention as illustrated in FIG. 5 and as measured in two different directions.
Figure 8:
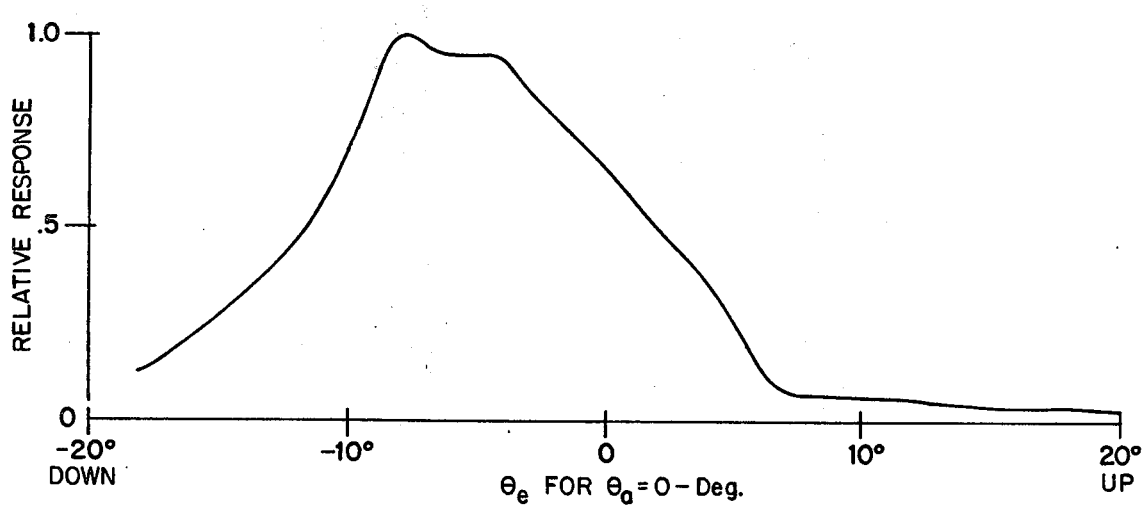

The scene regions from which the photodetector 46 receives radiation when the upper and lower apertures, 72, 72', 74 and 74', are respectively optically registered with the upper and lower parts, 45 and 47, of the optical element 44 will best be understood by now referring to FIG. 4. In FIG. 4 there is illustrated an arrangement by which both the angular directional response and the field of view of the invention can be conveniently measured. To determine the field of view and the angular directional response of the invention, the camera 10 is placed ahead of a plane (X-Y) that is arranged perpendicular to the optical axis, OA, of the camera taking lens 40. A small source, S, of constant output and occupying a small angular percentage of the total field of view of the camera 10 is then moved around on the plane in a systematic way and measurements of the output of the photodetector 46 are made in a well-known manner for each location of the source, S, on the normal plane while the field of view of the camera is otherwise kept dark and the blade apparatus 60 is placed in different arrangements. The magnitude of the output signal for each location of the source, S, is then divided by the peak magnitude recorded for all of the measurements made and the results are plotted as a function of the position of the source, S. This may be done in any convenient coordinate system such as the one illustrated in FIG. 4 wherein the source position is specified by an azimuth angle, $\theta_a$, and an elevation angle, $\theta_e$, the Y-axis corresponding to the vertical and the X-axis to the horizontal. The angular directional response for the invention when the blade apparatus 60 is in its arrangement illustrated in FIG. 5, normalized in the manner described as the azimuth of the source, S, changes while the elevation, $\theta_e$, is held constant at 0-degrees, is shown in FIG. 7. Positive $\theta_a$ represents positions of the source, S, to the right of the vertical or Y-axis while negative angles are those to the left of the vertical. The output of the photodetector 46, because of the manner in which the calculations were made, represents the relative response to the source, S, as based on its field position. FIG. 8 gives the angular directional response to changes in the elevation angle, $\theta_e$, of the source, S, while keeping the azimuth angle, $\theta_a$, equal to 0 degrees. The field of view of the invention is simply those extreme angles at which the photodetector 46 still responds to the source, S, and thus in FIG. 7 the field of view is generally ±20° about the vertical Y-axis and from FIG. 8, the field of view is approximately ±20° about the horizontal or X-axis with very little response occurring above $\theta_e \simeq 7$-degrees.

Figure 9:
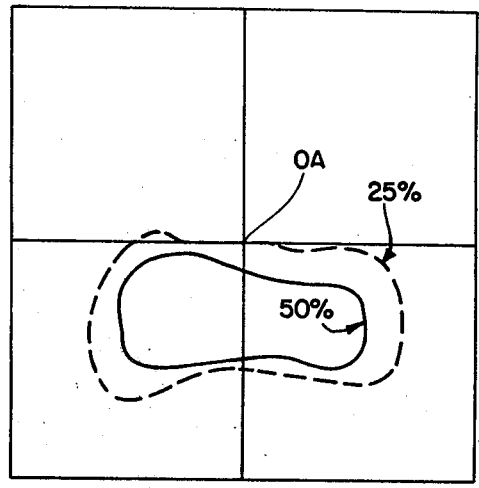
FIG. 9 is a graphical representation showing the region of a photographic scene from which the apparatus of the invention accepts radiation when in its configuration shown in FIG. 5.

If the angular directional response is measured in the foregoing manner at other azimuth angles while varying elevation angles, it is possible to obtain all the locations of the source, S, where the relative response is equal. This was done for the invention as illustrated in FIG. 5 and the lines of 25% and 50% relative response are shown in FIG. 9 superimposed on the field of view of the camera 10, i.e. the region in space which a scene would occupy. As can be seen in FIG. 9, the region of the scene from which the photodetector 46 receives radiation when the blade apparatus 60 is in its position corresponding to exposure under natural lighting conditions is slightly below the horizontal axis and centered about the vertical. This region is considered to be desirable when the subject of a photograph is being illuminated with natural light.

Figure 12:
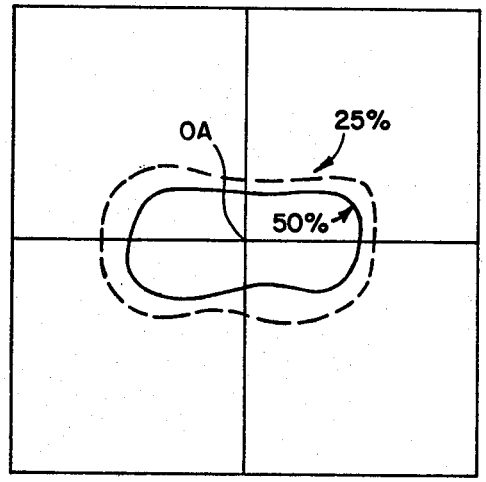
FIG. 12 is a graphical representation showing the region of a photographic scene from which the apparatus of the invention accepts radiation when in its configuration shown in FIG. 6.
Figure 10:
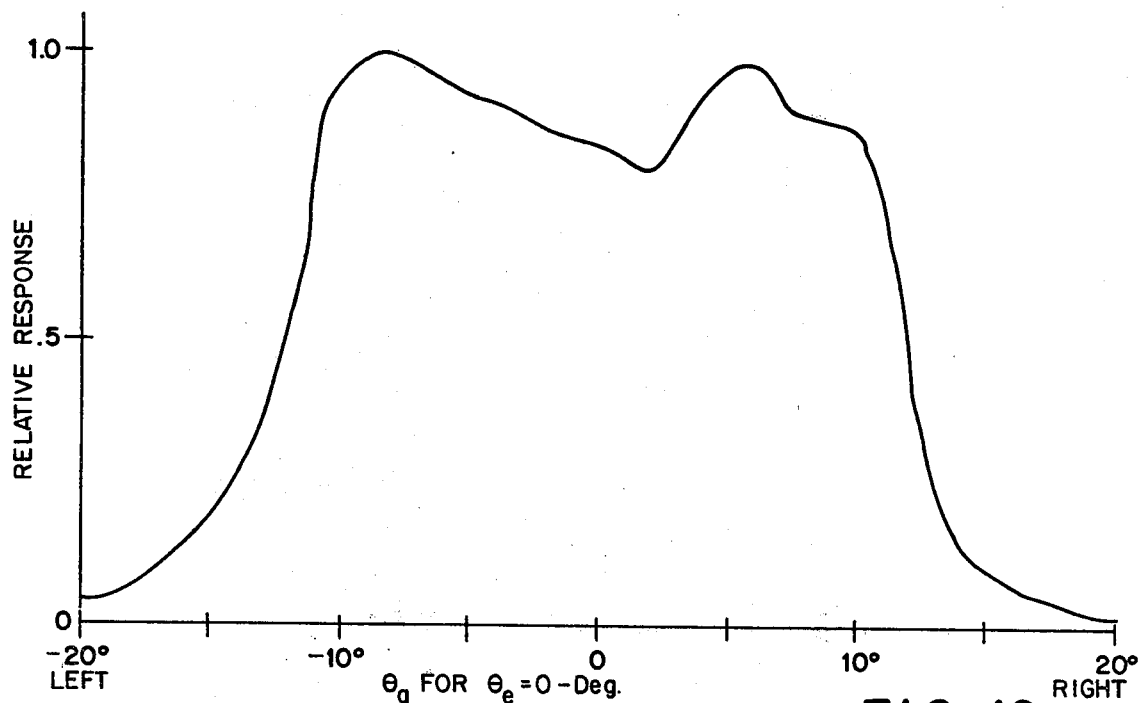
FIGS. 10 and 11 are graphical representations showing the angular directional response curves for the invention as illustrated in FIG. 6 and measured in two different directions.
Figure 11:
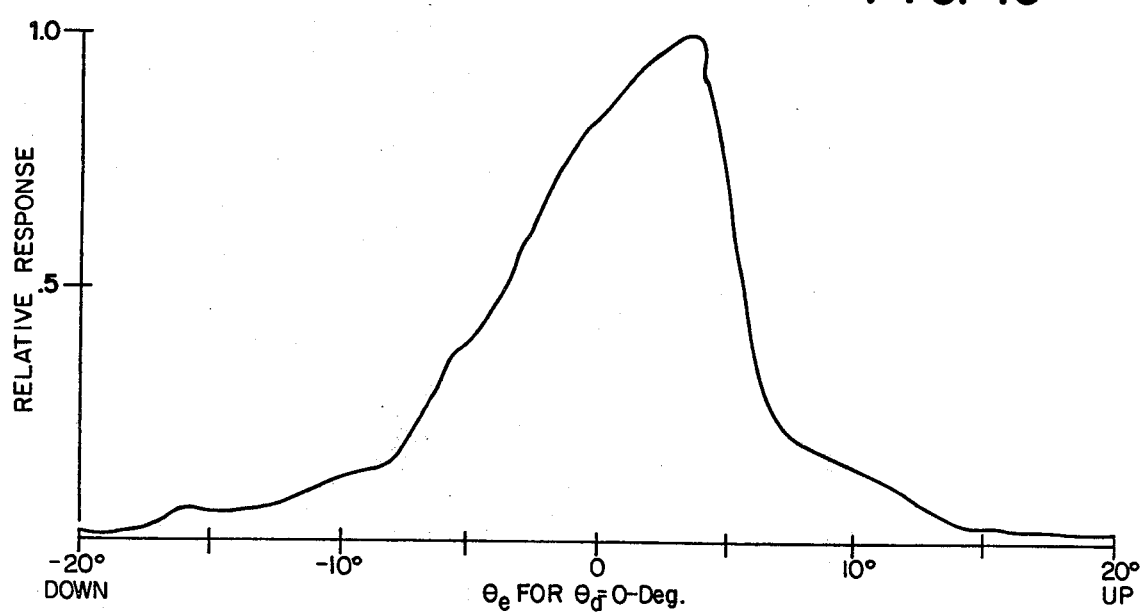

The horizontal angular directional response of the invention when the blade apparatus 60 is in its position illustrated in FIG. 6 is given by the curve in FIG. 10 while its vertical angular directional response for this blade apparatus position is shown by the curve of FIG. 11. The region of a scene from which the photodetector 46 receives radiation (25% or 50% response) while the blade apparatus 60 is in its position in FIG. 6 is shown in FIG. 12. As FIG. 12 illustrates the region from which the photodetector 46 receives radiation after the electronic flash 12 is fired is centered about the origin of the X-Y axes.

The manner in which the invention operates to collect radiation from different regions of a scene when the blade apparatus 60 is in its positions as illustrated in FIGS. 5 and 6 may best be understood by tracing light rays from the extreme edges of the photodetector 46 back out through the optical element 44 and the tunnel 48 and examining the regions in a scene from which those rays would have to originate to travel the ray paths selected. This is permissible because the path over which rays travel in entering and leaving an optical system are identical, i.e., an optical system behaves in a reversible manner.

In FIG. 5, rays 80 and 82 represent the extreme rays that can reach a scene from the upper edge of the photodetector 46 through the upper blade apertures, 72 and 74. The rays, 84 and 86, represent the extreme rays which can reach a scene from the bottom edge of the photodetector 46. It can be seen that the rays, 80 and 82, originate from a region in the scene which is below the horizontal while the rays, 84 and 86, originate from a region above the horizontal. It is to be noted that the lower edges of the upper blade apertures, 72 and 74, establish the angle at which the ray 86 leaves the optical system while the edges of the tunnel 48 establish the angle at which the ray 84 leaves the optical system. It will be appreciated by those skilled in the optical arts that the upper areas of the photodetector 46 receive relatively more energy from the portions of the scene below the optical axis, $OA_r$, than lower areas of the photodetector 46 receive from portions of the scene above the optical axis, $OA_r$, because the solid angle subtended by the rays, 80 and 82, is larger than that subtended by the rays, 84 and 86.

The solid angle as is well-known and described here is a measure of the local ability of the invention to collect radiant energy from the scene and varies in this instance from a relatively large angle for the upper areas of the photodetector 46 to a relatively smaller angle at its bottom area. This explains why the relative angular directional response in the vertical peaks around $-8$-Degrees as shown in FIG. 8 and is due to the asymmetric placement of the upper ones of the blade apertures, 74 and 76, with respect to the optical axis, $OA_r$, the central axis, CA, of the photodetector 46 and the location and structure of the optical element 44 and the tunnel 48.

FIG. 6 illustrates the extreme ray paths for the case when the lower ones of the blade apertures, 72 and 74, are aligned with the lower part 47 of the optical element 44. The rays, 88 and 90, represent the rays that reach the scene from the upper edge of the photodetector 46 and the rays, 92 and 94, represent the rays that can reach the scene from the lower edge of the photodetector 46. However, it can be seen that the solid angle subtended by the lower edge of the photodetector 46 (between rays 92 and 94) is relatively larger than that subtended by its upper edge (between rays 88 and 90). Consequently, the lower areas of the photodetector 46 receive relatively more energy from the upper portions of the scene than the upper areas of the photodetector 46 receive from the lower portions of the scene for the reasons discussed above and this accounts for the vertical relative directional response for the curve illustrated in FIG. 11.

The horizontal angular directional response for both arrangements illustrated in FIGS. 5 and 6 are generally symmetric about the vertical because both the upper and lower ones of the blade apertures, 72 and 74, are symmetrically disposed about the vertical in either of the arrangements illustrated in FIGS. 5 and 6.

Certain changes may be made in the above-described embodiment without departing from the scope of the invention. For example, the plane in which the blade apparatus 60 moves can be changed and can even be moved forward of the optical element 44. However, in the latter case, the vignetting effect of the edges of the blade apertures, 72 and 74, in combination with the wall surfaces of the tunnel 48 would be reduced. Also, the relative spacing of the optical element 44 and the photodetector 46 can be changed in combination with changes of the blade aperture location and size. Those skilled in the art may make still other changes. Therefore, it is intended that all matter contained in the above description or shown in the accompanying drawings shall be interpreted as illustrative and not in a limiting sense.

What is claimed is:

1. Photographic scene light detecting apparatus for use with a camera of the type which includes means for facilitating the positioning of film in an exposure plane, a light path for transmitting scene light to the exposure plane, and an electronic control system for receiving an input signal and controlling the firing of an electronic flash at a predetermined time after the initiation of an exposure interval, said apparatus comprising:

light detecting means, including at least one photodetector having a photosensitive surface of predetermined size with a central axis therethrough, for providing an electrical output signal for use as the input signal to the camera electronic control system, said output signal having a characteristic which varies in accordance with the amount of radiant power incident to said photosensitive surface;

optical means, including a converging lens stationed forwardly of said photodetector and having its optical axis offset with respect to said photodetector central axis and an oblique conical shaped tunnel positioned forwardly of said converging lens, converging toward said lens, and having an axis therethrough offset below said photodetector central axis, said converging lens structured and arranged to direct radiant energy from a scene toward said photodetector photosensitive surface whereby said photodetector operates to provide said output signal and said tunnel structured and arranged to limit the useful angular field of said converging lens;

blade apparatus; and means for mounting said blade apparatus for displacement between a first arrangement in which said blade apparatus is simultaneously in light blocking relation to both the camera light path and said photodetector thereby precluding scene light from being transmitted along the camera light path and from impinging on said photodetector photosensitive surface and a second arrangement in which said blade apparatus is simultaneously in light unblocking relation to both the camera light path and at least a portion of said photodetector photosensitive surface, said blade apparatus being structured to define a primary varying aperture aligned with the camera light path which aperture changes from an initial value to a final value during displacement of said blade apparatus from its first to second arrangement and further structured to selectively uncover different portions of said photodetector photosensitive surface during displacement of said blade apparatus from its first to second arrangement, said optical means, said photodetector, and said blade apparatus being structured to in combination operate so that, during displacement of said blade apparatus from its first to its second arrangement, said light detecting apparatus views the scene through different angular fields for different positions of said blade apparatus to facilitate exposure control by preferentially receiving radiant energy from different regions of a scene corresponding to times before and after the time at which the electronic flash is fired, one of said angular fields, corresponding to the time prior to the firing of the electronic flash, being aimed below the horizontal to preferentially expose subject matter in the lower regions of the scene and another of said angular fields, corresponding to the time after the firing of the electronic flash, being aimed equally above and below the horizontal to equally expose subject matter in the upper and lower regions of a scene.

2. The apparatus of claim 1 wherein said blade apparatus comprises at least one elongated opaque blade element mounted for counter-reciprocating motion along its elongated dimension and having formed therein a primary aperture of predetermined size and shape and at least two other apertures, each of predetermined size and shape, which are spaced away from said primary aperture by different predetermined distances as measured along the elongated dimension of said blade element, said apertures being further arranged so that, when said blade apparatus is in its first arrangement, the opaque portions of said blade element block both the camera light path and said photodetector photosensitive surface and so that, as said blade apparatus moves to its second arrangement, said blade element primary aperture progressively becomes aligned with the camera light path to admit scene light to the camera exposure plane and said blade element other apertures selectively become aligned with said photodetector photosensitive surface at different times during the displacement of said blade apparatus from its first to second arrangement to permit light from said different scene regions to travel to said photodetector.

3. The apparatus of claim 2 wherein said blade element other apertures are offset by different distances with respect to said optical means optical axis as measured in a direction generally perpendicular to said blade element elongated dimension.

4. The apparatus of claim 1 wherein said converging lens includes an aspheric surface to minimize spherical aberrations and wherein said predetermined distance by which said positive lens and said photodetector are spaced apart is substantially equal to said focal length of said positive lens.

5. The apparatus of claim 1 wherein said blade apparatus comprises a pair of opaque, elongated blade elements mounted for counter-reciprocating motion with respect to one another along their respective elongated dimensions and wherein each blade element has formed therein a primary aperture of predetermined size and shape and at least two other apertures, each of predetermined size and shape and each spaced away from said primary aperture by different predetermined distances as measured along the elongated dimension of their respective blade element, said apertures being further arranged so that, when said blade apparatus is in its first arrangement, said blade element primary apertures and said other apertures are all misaligned with respect to one another to block the camera light path and to cover said photodetector photosensitive surface and so that, as said blade apparatus moves toward its second arrangement, said primary apertures progressively overlap one another in alignment with the camera light path to define said primary varying aperture and corresponding ones of said blade element other apertures progressively overlap one another to selectively become aligned with said photodetector photosensitive surface at different times to permit light from said different scene regions to travel to said photodetector.

* * * * *